United States Patent [19]
Fowell

[11] Patent Number: 5,184,790
[45] Date of Patent: Feb. 9, 1993

[54] TWO-AXIS ATTITUDE CORRECTION FOR ORBIT INCLINATION

[75] Inventor: Richard A. Fowell, Culver City, Calif.

[73] Assignee: Hughes Aircraft Company, Los Angeles, Calif.

[21] Appl. No.: 733,783

[22] Filed: Jul. 22, 1991

[51] Int. Cl.$^5$ ............................................. B64G 1/28
[52] U.S. Cl. ................................................... 244/165
[58] Field of Search ............... 244/164, 165, 171, 169; 364/434, 459

[56] References Cited

U.S. PATENT DOCUMENTS

| | | | |
|---|---|---|---|
| 4,084,772 | 4/1978 | Muhlfelder | 244/165 |
| 4,776,540 | 10/1988 | Westerlund | 244/164 |
| 4,911,385 | 3/1990 | Agrawal et al. | 244/165 |
| 5,042,752 | 8/1991 | Surauer et al. | 244/165 |

OTHER PUBLICATIONS

Parvez et al., "Gstar III Attitude for Inclined Geo-Stationary Orbit", 1990, A1AA-90-3493CP, pp. 1615-1624.

*Primary Examiner*—Galen Barefoot
*Attorney, Agent, or Firm*—Steven M. Mitchell; Gordon R. Lindeen, III; Wanda K. Denson-Low

[57] ABSTRACT

The attitude corrections required to remove attitude errors induced by orbit inclination deviations from the normal orbit plane, as well as the residual errors, are minimized by placing the satellite bias momentum at an inertial attitude lying substantially between the normals of the nominal and actual orbits, and using a payload reorientation means to adjust the payload attitude about three axes based on a combination of sensor data and offsets computed from the known orbit kinematics. In one embodiment, a momentum bias satellite is in an orbit slightly inclined from the geostationary orbit. The desired angular momentum vector attitude is chosen based on the orbit, the desired payload attitude, and the gimbal capabilities, and executed using thrusters. This reorientation limits the required gimbal travel. Based on this information, time-varying payload offsets in yaw, pitch and roll are computed from the nominal attitude produced by nulling earth sensor errors in roll and pitch, and using momentum bias and yaw estimation to control yaw. These offsets are implemented by a 3-axis gimbal between the momentum bias and the payload. Other sensors, actuators, or orbits could be used, including beacon sensors, star sensors, magnetic torquing, solar torquing, electronic steering, and other gimbal arrangements.

19 Claims, 1 Drawing Sheet

TWO-AXIS ATTITUDE CORRECTION FOR ORBIT INCLINATION

BACKGROUND OF THE INVENTION

1. Field of the Invention

This invention relates generally to a method for maintaining a satellite in an orbit, and more particularly to a method of operating a satellite in an earth orbit inclined to its nominal orbit by placing its angular momentum between the normals of its nominal and actual orbits, especially where the satellite is a communications satellite in a near-geosynchronous orbit.

2. Discussion of the Related Art

For certain satellites, such as communication satellites, it is generally desirable to maintain the satellite in an orbit about the earth such that it remains in a rigid location above a specific point on the earth. This type of orbit is referred to as a geosynchronous orbit, and is represented by a distance of approximately 6.61 times the radius $r_e$ of the earth ($r_e$ is approximately equal to 3964 miles, which gives a geosynchronous orbit of about 22,400 miles). This enables a communication beam from the satellite to accurately cover a desirable area, such as a particular country, on the surface of the earth. Any deviations from this orbit will alter the coverage of the beam. To remain in a geosynchronous orbit it is necessary that the satellite's orbit be substantially in the equatorial plane of the earth at this distance. The satellite itself is oriented perpendicular to this plane. Because of these requirements earth's geosynchronous orbit is crowded with a multitude of satellites further making it necessary to maintain the satellite in a specific desirable location in its orbit. Other considerations and advantages of maintaining the satellite in an accurate geosynchronous orbit are well known to those skilled in the art.

A satellite placed in a geosynchronous orbit will experience deviations from the orbit due to certain effects such as gravitational forces from the sun and moon, as well as deviations from variations in the gravitational force of the earth due to its oblateness. These forces tend to move the satellite in both a north/south (N/S) direction, i.e., above and below the equatorial plane, and an east/west (E/W) direction, i.e. left or right on the orbital path. Excursions in the N/S direction are generally more damaging because they tend to move the satellite out of the equatorial plane and into an inclined orbit. Any deviation causing the satellite to direct its antenna away from a subsatellite boresight location (the specific location which the satellite antenna is directed at) tends to alter the coverage of the entire beam thus providing undesirable results. The undesirable results include missed coverage of the entire target, interference with other communication beams, etc. These deviations are magnified by the fact that the beam can be accurately shaped to a desired target area, such as a country. To an observer at the subsatellite location the satellite appears to be moving in a "figure eight" pattern once per sidereal day due to the satellite being in the inclined orbit.

The above mentioned deviations from the desired geosynchronous orbit of the satellite are generally corrected by equipping the satellites with thrusters, well known to those skilled in the art, to maintain the satellite in the equatorial plane and proper spin orientation. These thrusters require certain propellants which obviously must be stored on the satellite from the time the satellite is launched into orbit until the end of the useful life of the satellite. Since the known propellants are relatively heavy, and the satellite has certain weight restrictions to enable it to be launched into orbit, the useful life of the satellite is usually limited by the amount of propellant which can be stored. Consequently, this provides a critical concern in the design of geosynchronous satellites.

Since maintaining the satellite in the equatorial plane requires excessive thruster fuel usage, it has been proposed in the art to enable the satellite to operate in a slightly inclined orbit and alter the angular placement of the satellite to maintain the appropriate direction of the beam.

The potential benefits of a satellite that can operate in a slightly inclined orbit are a useful service life that could be extended by roughly two years per degree of allowable inclination. To achieve this, it has been proposed that the satellite would be initially launched into an inclined orbit that would naturally drift to an equatorial orbit. This is frequently done in any case, when replacement satellites are launched while their predecessors are still useful, to avoid wasting fuel on inclination control before the satellite is needed. When the satellite inclination reaches the level the satellite can handle, it can commence operation. Once it reaches equatorial orbit, it can operate there until fuel is low, then inclination control can be suspended, and the ( satellite will operate until the inclination exceeds the satellite's limit. The added lifetime is the time taken to drift from the inclination limit to the equatorial plane in the beginning, plus the time taken to drift from the equatorial plane to the inclination limit divided by the average inclination drift rate. The drift rate is less than one degree per year, yielding the figure of two years per degree of allowable inclination. Since communication satellite revenues can exceed $100 million per year, the economic value of this added lifetime is considerable. This value is somewhat reduced by the requirement that the ground antennas be able to track the apparent action of the satellite, but many satellite users, especially mobile users such as ships, planes, and trucks, already have this capability.

To understand how to remove or minimize the undesirable antenna/payload pointing deviations attributed above to orbit inclination, it is useful to discuss how satellite orientation is normally maintained. Most geosynchronous satellites stabilize the satellite attitude by providing a bias angular momentum which resists changes in orientation due to external torques transverse to the bias momentum, a quality often termed "gyroscopic stiffness". Properly sized and maintained, the orientation of the bias momentum remains substantially fixed with respect to the fixed stars. Such satellites are called "momentum bias satellites". The momentum bias is usually supplied by one or more momentum or reaction wheels, which spin a large portion of the satellite (as in "dual-spin" satellites), spin the entire satellite, or by other known means. The direction of the bias momentum vector for geosynchronous satellites is usually maintained within a few degrees of perpendicular to the plane of the orbit (orbit normal). When the satellite is in an exact, non-inclined geosynchronous orbit, this direction is also normal to the equatorial plane (equatorial normal).

While the satellite bias momentum resists changes of satellite orientation transverse to the bias momentum, it does not resist rotations about the bias momentum axis. Such rotations are typically corrected by variations in the magnitude of the bias momentum under closed loop control using an attitude sensor and feedback control. Such control is easily provided, and well known to those skilled in the art.

Commonly, the basic momentum bias system described above is not sufficient to point the payload, or communications beam pattern to the desired accuracy, and thus further means are provided to correct the orientation of the payload or communications beam pattern with respect to the orientation provided by the basic bias momentum attitude.

The desired payload orientation can be described with respect to the bias momentum orientation by describing the necessary corrections that would be required to place the payload in the desired orientation by beginning with the payload in the orientation produced by the bias momentum control without further correction, and rotating it sequentially about three mutually perpendicular axes fixed in the payload, these axes being referred to as the yaw, roll and pitch axes. The required correction angles are referred to as the "yaw error", "roll error", and "pitch error", since, when they are non-zero, the payload is not in its desired orientation. When the spacecraft is in a circular, equatorial, geosynchronous orbit, and the satellite attitude is such that the yaw, roll, and pitch errors are zero, the yaw axis is directed from the satellite to the center of the earth, the pitch axis is directed normal to the plane of the orbit, and pointing south, and the roll axis is perpendicular to the other two, pointing in the direction of travel of the spacecraft. For small errors, the order of the rotations is relatively unimportant, and the effects of roll, pitch and yaw error are as follows: a roll error moves the ground location of the communication pattern away from the desired location in a North/South direction, a pitch error results in an East/West error on the ground, and a yaw error results in a rotation of the ground pattern about the line to the satellite. In general, precise definition of the order, sense, and direction of axes used and the assumed starting orientation is required to accurately describe the pointing error, and usage varies.

The description above is sufficient to describe the basic issues and prior art. The roll, pitch, and yaw errors cause all the undesirable results described above under subsatellite boresight deviation, and if too large, reduce or eliminate the economic usefulness of the satellite.

Schemes for providing attitude control for inclined, near-geosynchronous orbits can be classified by how they place the attitude of the nominal bias momentum, and what further corrections of the payload attitude with respect to the bias momentum attitude are performed. The choice of bias momentum attitude produces payload errors in yaw, roll and pitch that vary periodically over the orbit. Typically, the pitch errors produced by slightly inclined orbits are very small, and the concentration has been on reducing the roll and yaw errors. Since payload performance is typically more sensitive to roll errors than to yaw errors, primary emphasis is placed on removing roll errors. In general, however, payload performance is degraded by the presence of all three types of error, and it is most desirable to eliminate all three.

Placing and maintaining the inertial direction of the bias momentum vector in the face of disturbance torques requires that external torques be applied. Many suitable methods are known to the state of the art including the use of thrusters, magnetic torques, and solar sails.

One of the simplest schemes is to place the bias momentum at orbit normal, without further corrections. This results in roll errors on the order of 18% of the orbit inclination angle, and yaw errors equal to the orbit inclination angle.

A refinement of this scheme is to place the satellite bias momentum at an optimum inertial attitude, without further corrections. This method is disclosed in U.S. Pat. No. 4,776,540 to Westerlund, herein incorporated by reference. The Westerlund reference discloses that by placing the bias momentum vector in the plane of equatorial normal and orbit normal of the inclined orbit, offset from orbit normal in the direction away from equatorial normal, roll errors can largely be eliminated for an area of interest. The size of the offset is a function of the location of the area of interest on the earth's surface, but is on the order of 18% of the angle between equatorial normal and orbit normal. This scheme results in a yaw error angle that is slightly larger than the angle of inclination of the orbit.

Another prior art method of maintaining a satellite in an appropriate geosynchronous orbit is maintaining the satellite in equatorial normal, i.e., perpendicular to the equatorial plane of the earth while the satellite is in an inclined orbit. This configuration creates an error that is almost purely in roll. Such a stabilization method is disclosed in U.S. Pat. No. 4,084,772 to Muhlfelder, herein incorporated by reference. Specifically, that patent discloses a transverse momentum wheel incorporated on board the satellite to compensate for roll attitude deviations. The wheel is oriented along an axis parallel to the satellite's yaw axis. This method includes use of a closed loop roll correction system which is updated to correct for roll by a sinusoidal pattern on each orbit of the satellite.

Other prior art methods maintain the bias momentum at equatorial normal, and offset the payload attitude in roll by using a momentum wheel with a roll-axis pivot, as in many RCA (trade name) geosynchronous communications satellites, or by offsetting the communications beam in roll using an antenna gimbal, as in the Hughes Aircraft HS-376 geosynchronous communications satellites. Such systems largely eliminate the roll, pitch and yaw errors induced by orbit inclination when controlled by closed loop control based on ground-based radio beacon signals.

Methods which require placing the satellite's attitude in either the equatorial normal or the orbit normal, thus requiring compensation in the roll direction or yaw direction, respectively, generally require a large gimbal range in the specific direction of compensation. Moreover, movable antennas and the like typically require separate gimbals for each antenna, thus requiring additional components adding to the weight of the satellite.

The paper, "GSTAR III Attitude for Inclined Geostationary Orbit" (AIAA-90-3495-CP), by S. A. Parvez and P. K. Misra, presents a technique where a spacecraft is generally kept orbit normal, with a momentum wheel roll gimbal used to remove the resulting inclination-induced roll errors, while the yaw error is simply ignored. In this case, when the inclinations are large enough that the yaw error inherent in this strategy cannot be tolerated, the yaw error is reduced to an acceptable level by reorienting the bias momentum from orbit normal closer to equatorial normal, until the yaw error is reduced to an acceptable level. This procedure is at the cost of increasing the roll correction. In the event that the roll gimbal range is insufficient to reduce the yaw error to the desired level, the option of reorienting the angular momentum four times daily by thruster maneuvers is discussed.

Some satellites include the capability of correcting attitude in both roll and yaw, simply to meet their non-inclined requirements. Such satellites include those with two-axis gimballed wheels, double vee-wheels, and those with the capability of cheaply and continuously varying the direction of their bias momentum through the use of magnetic or solar torques. The prior art, which applies corrections in at most a single axis, limits the correctable inclination to the means available about a single axis: e.g., gimbal angle, maximum transverse roll momentum bias, or yaw magnetic or solar torque. The other axis capability is unused. An object of the present invention is to maximize the orbit inclination capability of such satellites by using the actuation range available in both roll and yaw axes. Since communication satellite revenues can exceed $10 million per month, and the potential added life is greater than 1 month per 0.05 degrees of allowable inclination, the capability to handle even a few extra tenths of a degree of inclination has considerable economic value.

SUMMARY OF THE INVENTION

Disclosed is a technique for operating a satellite or spacecraft in an orbit which is inclined relative to the earth's equatorial plane with no roll, pitch or yaw errors, while minimizing the angular corrections required to maintain the payload in the proper pointing orientation. The attitude motion required to maintain payload pointing at a fixed point on the earth is shown to be a coning motion at twice the orbit rate in inertial space. This cone, traced out by the payload pitch axis, is tangent to the orbit normal direction, and for small orbit inclinations, is a right circular cone. The symmetry axis is near the mean of orbit normal and equatorial normal. If the pointing goal is to maintain the satellite pointed at a fixed point on the earth, the symmetry, axis is at the mean of equatorial normal and the direct-ion as disclosed by the formula in the referenced Westerlund patent above for the fixed point in question.

In one preferred embodiment, the satellite bias momentum vector is placed along the symmetry axis of the cone, and the payload is offset diurnally in yaw by an offset angle calculated from the orbit inclination, and is controlled in roll and pitch by closed-loop control based on radio beacon signals emanating from the fixed point, with the corrections in all three axes provided by a momentum wheel on a two-axis gimbal. The peak required offset in roll and yaw is reduced to half that required by the prior art. This permits the orbit inclination whose pointing errors can be corrected by a symmetric gimbal to be increased by a factor of two, allowing the useful life of the satellite to be extended beyond that when the fuel available to maintain an equatorial orbit would be exhausted.

More particularly, the invention includes a method of orienting a payload located on a momentum bias satellite, which satellite is in a orbit significantly perturbed in inclination from a nominal orbit and possesses the capability to reorient the payload from its nominal orientation by a significant angle about any commanded direction. The method accomplishes the dual objectives of maintaining the payload pointed at the orbited body in a fashion closely resembling the pointing in the nominal orbit and limiting in some sense the magnitude of the reorientation required in directions transverse to the bias momentum, by means of placing the nominal direction of the bias momentum at a preferred inertial attitude which lies substantially between the orbit normals of the nominal and actual orbits and reorienting the payload by a significant amount about at least two axes transverse to the nominal direction of the bias momentum. In one embodiment, the method is comprised of the following steps:

1. Determining the actual satellite orbit using standard orbit determination means.
2. Determining the cone in inertial space traced by the payload pitch axis when the payload maintains its desired pointing throughout the actual orbit, using standard kinematic calculations known to those skilled in the art.
3. Orienting the satellite bias momentum within the inertial cone so that the required payload offset profile is optimal with respect to the available payload reorientation means, using standard means for reorienting satellite angular momentum by application of external torques.
4. Offsetting the spacecraft payload periodically about control axes that will not be controlled by feedback control based on attitude profiles computed from the kinematics profile analysis and the known orbit.
5. Controlling the payload attitude about the remaining axes by feedback control from attitude sensors, including, if required, offset profiles from the sensed attitude, based on kinematic calculations using the known orbit, the desired payload pointing profile, and the attitude profiles commanded for the other axes.

Additional objects, advantages, and features of the present invention will become apparent from the following description and appended claims, taken in conjunction with the accompanying drawings.

DETAILED DESCRIPTION OF THE PREFERRED EMBODIMENT

The following description of the preferred embodiments is merely exemplary in nature and is in no way intended to limit the invention or its application or uses.

The most immediate application of this invention is to a communications satellite that is nominally in a geostationary orbit, i.e., a circular orbit with a 24 hour period in the plane of the earth's equator. Such orbits have the property that points on the earth appear stationary when viewed from the satellite, and vice versa, hence the name, "geostationary".

We first assume that the satellite operates satisfactorily in the nominal orbit, and that the issue is how to correct the payload attitude when the plane of the actual orbit has drifted, so that it intersects the equatorial plane at an angle $\theta$. Such orbit drift occurs naturally through the gravitational influences of the sun, moon and oblate earth.

We further assume that the satellite is a momentum bias satellite, i.e., that it possesses a source of angular momentum which is nominally normal to the orbit. In the absence of external forces, the direction of the satellite's angular momentum remains inertially fixed, so this angular momentum provides a reference vector nearly parallel to the orbit normal. This momentum bias is used to prevent undesired spacecraft and payload attitude rotations about directions transverse to the bias momentum. In a preferred embodiment, this momentum is provided by a momentum wheel.

The satellite is also assumed to have both a sensor and actuator for rotating the satellite about the bias momentum to maintain the satellite pointing at the earth. In a preferred embodiment, the sensor is an infrared earth sensor that measures in two axes the deviations of the earth sensor boresight direction from nadir. The earth sensor should have an "offset pointing" capability, i.e., it should be capable of accurately measuring deviations on the order of a degree or so. Suitable earth sensors are well known to those skilled in the art. The actuator for rotating the satellite about the bias momentum is assumed to be an electric motor controlling the spin speed of the momentum wheel.

We also assume in the following that the orbit elements and the inertial direction of the momentum bias, are known, and that the direction of the momentum bias can be reoriented as desired using thrusters or other external torquing means. Techniques for determining the orbit elements and the direction of the satellite's angular momentum vector, and of correcting the direction of the satellite's angular momentum vector, are well known in the state of the art, and such determinations and corrections are standard procedure for geostationary spacecraft. A discussion of these techniques in some detail is presented in U.S. Pat. No. 4,776,540, columns 14–16.

One consequence of assuming the satellite operates satisfactorily in its nominal orbit is the assumption that any issues common to both the normal and the inclined orbit are dealt with via the means known to the state of the art for operating geostationary spacecraft. Here we simply describe how to correct for the orbit inclination drift effect. For example, both orbit and the satellite's attitude are subject to disturbances other than orbit inclination drift. The correction techniques presented here will be simply summed to the normal corrections for the other effects that would normally be required in the geostationary orbit.

We proceed by first determining what the desired payload attitude profile is for the satellite in the inclined orbit. Second, we determine what the payload attitude would be if no special measures were taken, except for setting the angular momentum bias at an arbitrary fixed inertial direction, not necessarily orbit or equatorial normal. Third, we compute the difference between the nominal and the desired attitude histories to find the necessary payload attitude correction time history as a function of the momentum bias direction. Fourth, we convert the attitude correction time history to gimbal angle time histories as a function of the momentum bias direction. Fifth, we select the momentum bias direction to optimize the required gimbal angles, based on the gimbal angle time histories. Finally, we upload the gimbal angle offset functions to the satellite, which computes them as a function of time, and adds them into the command signals to each gimbal. We now describe each step in detail.

Before going into details, we need to define the problem. Since the problem involves orientations, we need a way to describe the orientations. We will describe the orientations in terms of coordinate reference frames rigidly embedded in bodies. Each reference frame will be defined by three mutually orthogonal unit basis vectors, representing the directions of three mutually orthogonal axes of the reference frame. For example, frame A is defined by the three unit basis vectors $\hat{a}_1$, $\hat{a}_2$ and $\hat{a}_3$, representing the directions of the $A_1$ axis, $A_2$ axis, and $A_3$ axis. The " $\hat{}$ " on a variable indicates that it is a unit vector. As is standard practice, all reference frames used here will be right-handed, e.g., $\hat{a}_1 \times \hat{a}_2 = \hat{a}_3$. The relative orientations between frames will be described by direction cosine matrices. For example, the direction cosine matrix $C_{ab}$ is the $3 \times 3$ transformation matrix that maps vectors expressed in frame B to vectors expressed in frame A. The columns of $C_{ab}$ are simply the basis vectors of B expressed in frame A, and the rows of $C_{ab}$ are simply the basis vectors of frame A expressed in frame B. Further, $C_{ba}$ is simply the transpose of $C_{ab}$.

Figure 1A:
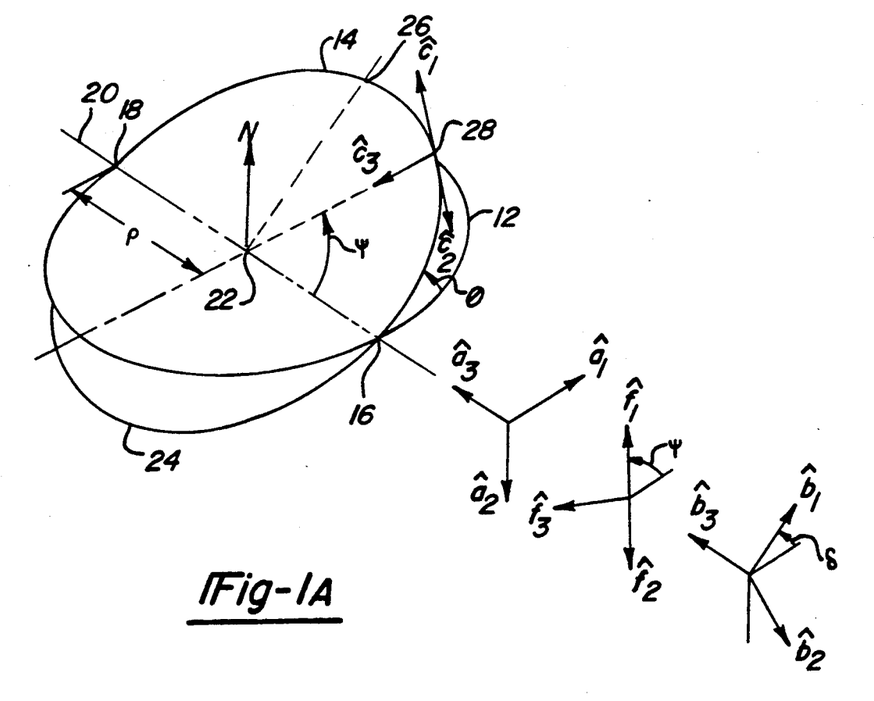
FIGS. 1(a) and 1(b) are orbit representations of a satellite orbiting the earth in a circular orbit inclined by an angle $\theta$ to the equator.

FIG. 1(a) shows the relationship between the geostationary orbit 12 and an inclined orbit 14 forming the geostationary orbit plane and the inclined orbit plane, respectively. The intersection between the two orbits where a spacecraft or satellite 10 orbiting the earth 30 (see FIG. 1(b)) in the inclined orbit 14 crosses the equatorial plane from south to north is called the ascending node 16, and the other intersection is called the descending node 18. The line connecting the two nodes is defined as the line of nodes 20. It is also the line of intersection between the two orbit planes. The angle between the two orbit planes will be defined as $\theta$ as shown. At the center of the orbits 12 and 14 is the earth's center 22. The orbit radius $\rho$ is the distance between the earth's center 22 and either of the orbits 12 or 14. Also shown is a point of maximum descension 24 of the satellite 10 in the inclined orbit 14, and a point of maximum ascension 26 of the satellite 10 in the inclined orbit 14. In FIG. 1(a) the location of satellite 10 in inclined orbit 14 is at point 28. Point 28 is the point satellite 10 occupies 2 hours before the point of maximum ascension 26. For the purpose of this example, both orbits 12 and 14 will be assumed to be circular. In practice, this is very nearly true. If the difference is significant, the procedure presented here can be done using more accurate orbit models, numerically if need be.

Figure 1B:
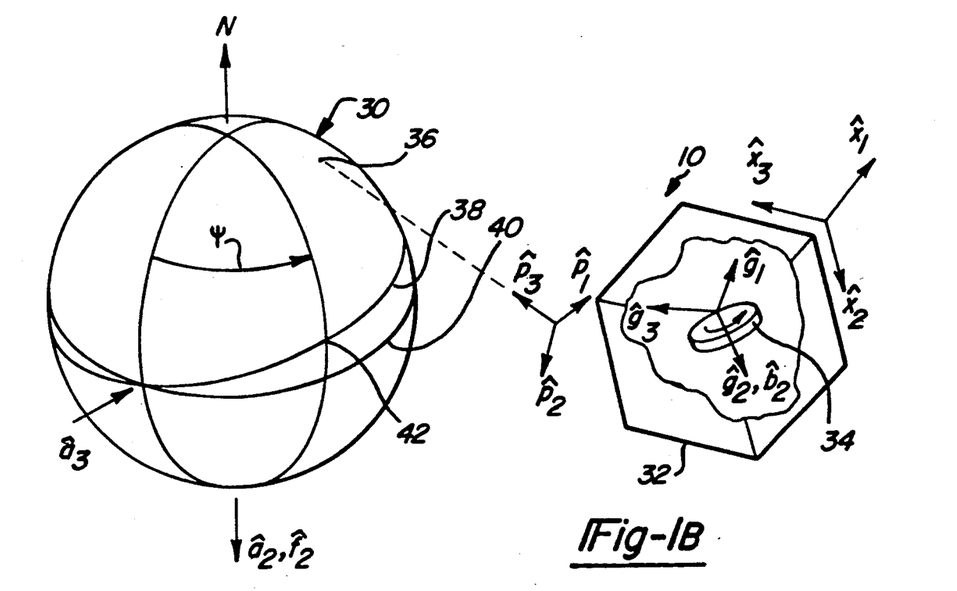

FIG. 1(b) shows the satellite 10 in orbit about the earth 30. The satellite 10 includes a payload 32, shown here as a cube, and a 3-axis momentum wheel gimbal 34. Payload 32 and momentum wheel gimbal 34 are oriented on separate axes movable relative to each other, as shown by the different coordinate axes. The satellite 10 has a pointing vector directed towards an arbitrary earth fixed point 36. Also shown is a circle 38 on the earth 30 representative of the intersection of the inclined orbit plane 14 with the earth's surface. The equator 40 of the earth 30 is representative of the intersection of the geostationary orbit 12 with the earth's surface. The sub-satellite point 42 is the position on the earth 30 which lies on a line from the satellite 10 to the center of the earth 30. This direction from the satellite 10 to the earth's center 22 is called the nadir. The seven coordinate axes frames shown in FIGS. 1(a) and 1(b) will be discussed below.

The discussion below uses seven reference frames:

Frame A: an inertially fixed frame aligned to the line of nodes;

Frame B: frame A, rotated about the line of nodes by the angle $\delta$ which makes $\hat{b}_2$ parallel to the bias momentum vector;

Frame C: an inclined orbit normal frame aligned to nadir;

Frame F: an earth-fixed frame, coinciding with A when the satellite crosses the ascending node;

Frame G: the spacecraft frame in its nominal orientation in the inclined orbit;

Frame P: a frame fixed in the payload, representing the desired payload orientation; and Frame X: another payload-fixed frame, aligned to the spacecraft frame when in geostationary orbit.

The direction cosine matrices $C_{ba}$, $C_{ca}$, $C_{fa}$, $C_{ga}$, $C_{ap}$ and $C_{px}$ are defined below. Their derivation will be discussed momentarily. The required correction reorientation of the payload to correct for the inclined orbit effects is $C_{xg}$, which is the matrix transpose of $C_{gx} = C_{ga} C_{ap} C_{px}$. A small-angle version of $C_{xg}$, obtained by a Taylor expansion of $C_{xg}$ in terms of "$\theta$" and "$\delta$", is also shown. Each direction cosine matrix is presented below as a dot product multiplication table between the unit vectors of the two frames related by the direction cosine matrix. The table entries themselves are the direction cosine matrix in each case.

Definitions: $c\delta = \cos(\delta)$, $c\Theta = \cos(\Theta)$, $c\psi = \cos(\psi)$
$s\delta = \sin(\delta)$, $s\Theta = \sin(\Theta)$, $s\psi = \sin(\psi)$ 1. $C_{ba}$

| * | $\hat{a}_1$ | $\hat{a}_2$ | $\hat{a}_3$ |
|---|---|---|---|
| $\hat{b}_1$ | $c\delta$ | $-s\delta$ | 0 |
| $\hat{b}_2$ | $s\delta$ | $c\delta$ | 0 |
| $\hat{b}_3$ | 0 | 0 | 1 |

$= C_{ba}$

2. $C_{ca}$

| * | $\hat{a}_1$ | $\hat{a}_2$ | $\hat{a}_3$ |
|---|---|---|---|
| $\hat{c}_1$ | $c\Theta c\psi$ | $-s\Theta c\psi$ | $s\psi$ |
| $\hat{c}_2$ | $s\Theta$ | $c\Theta$ | 0 |
| $\hat{c}_3$ | $-c\Theta s\psi$ | $s\Theta s\psi$ | $c\psi$ |

$= C_{ca}$

3. $C_{fa}$

| * | $\hat{a}_1$ | $\hat{a}_2$ | $\hat{a}_3$ |
|---|---|---|---|
| $\hat{f}_1$ | $c\psi$ | 0 | $s\psi$ |
| $\hat{f}_2$ | 0 | 1 | 0 |
| $\hat{f}_3$ | $-s\psi$ | 0 | $c\psi$ |

$= C_{fa}$

4. $C_{ga}$

| * | $\hat{a}_1$ | $\hat{a}_2$ | $\hat{a}_3$ |
|---|---|---|---|
| $\hat{g}_1$ | $\dfrac{c\delta c\psi}{Kg}$ | $\dfrac{-s\delta c\psi}{Kg}$ | $\dfrac{s\psi(s\delta s\Theta + c\delta c\Theta)}{Kg}$ |
| $\hat{g}_2$ | $s\delta$ | $c\delta$ | 0 |
| $\hat{g}_3$ | $\dfrac{-c\delta s\psi(s\delta s\Theta + c\delta c\Theta)}{Kg}$ | $\dfrac{s\delta s\psi(s\delta s\Theta + c\delta c\Theta)}{Kg}$ | $\dfrac{c\psi}{Kg}$ |

$= C_{ga}$ where $Kg = \sqrt{(c\psi)^2 + (s\psi(s\delta s\Theta + c\delta c\Theta))^2}$ 5. $C_{ap}$

| * | $\hat{p}_1$ | $\hat{p}_2$ | $\hat{p}_3$ |
|---|---|---|---|
| $\hat{a}_1$ | $P_{11}/K_{p1}$ | $P_{21}/K_{p2}$ | $P_{31}/K_{p3}$ |
| $\hat{a}_2$ | 0 | $P_{22}/K_{p2}$ | $P_{32}/K_{p3}$ |
| $\hat{a}_3$ | $P_{13}/K_{p1}$ | $P_{23}/K_{p2}$ | $P_{33}/K_{p3}$ |

$= C_{ap}$ where:
$P_{11} = xs\psi + (z + \rho)c\psi$
$P_{13} = -(xc\psi - (z + \rho c\Theta)s\psi)$
$P_{21} = -(xc\psi - (z + \rho c\Theta)s\psi)(y + \rho s\Theta s\psi)$
$P_{22} = (xc\psi - (z + \rho c\Theta)s\psi)^2 + (xs\psi + (z + \rho)c\psi)^2$
$P_{23} = -(xs\psi + (z + \rho)c\psi)(y + \rho s\Theta s\psi)$
$P_{31} = xc\psi - (z + \rho c\Theta)s\psi$
$P_{32} = y + \rho s\Theta s\psi$
$P_{33} = xs\psi + (z + \rho)c\psi$ $K_{p1} = \sqrt{P_{11}^2 + P_{13}^2}$ $K_{p2} = \sqrt{P_{21}^2 + P_{22}^2 + P_{23}^2}$ $K_{p3} = \sqrt{P_{31}^2 + P_{32}^2 + P_{33}^2}$ 6. $C_{px}$

| * | $\hat{x}_1$ | $\hat{x}_2$ | $\hat{x}_3$ |
|---|---|---|---|
| $\hat{p}_1$ | $(z + \rho)/K_{x1}$ | 0 | $-x/K_{x1}$ |
| $\hat{p}_2$ | $-xy/K_{x2}$ | $(x^2 + (z + \rho)^2)/K_{x2}$ | $-y(z + \rho)/K_{x2}$ |
| $\hat{p}_3$ | $x/K_{x3}$ | $y/K_{x3}$ | $(z + \rho)/K_{x3}$ |

$= C_{px}$

-continued where:

$$K_{x1} = \sqrt{(z+\rho)^2 + x^2}$$

$$K_{x2} = K_{x1}K_{x3}$$

$$K_{x3} = \sqrt{x^2 + y^2 + (z+\rho)^2}$$

7. $\tilde{C}_{xg}$ (linearized approximation of $C_{xg}$, good for small $\theta, \delta$)

$$C_{xg} = (C_{ga}C_{ap}C_{px})^T$$

$$\tilde{C}_{xg} = \left(C_{xg}\Big|_{\substack{\theta=0\\\delta=0}}\right) + \left(\frac{\partial C_{xg}}{\partial \theta}\Big|_{\substack{\theta=0\\\delta=0}}\right)\theta + \left(\frac{\partial C_{xg}}{\partial \delta}\Big|_{\substack{\theta=0\\\delta=0}}\right)\delta$$

$$\tilde{C}_{xg} = \begin{bmatrix} 1 & 0 & 0 \\ 0 & 1 & 0 \\ 0 & 0 & 1 \end{bmatrix} + \begin{bmatrix} 0 & x & 0 \\ -x & 0 & -(z+\rho) \\ 0 & (z+\rho) & 0 \end{bmatrix} \frac{\rho s\psi\theta}{L} + \begin{bmatrix} 0 & c\psi & 0 \\ -c\psi & 1 & s\psi \\ 0 & -s\psi & 0 \end{bmatrix}\delta$$

8. Approximate payload correction angles (assuming small $\theta, \delta$):

Roll correction: $\Theta_1 = \left(\delta - \frac{\rho(z+\rho)\theta}{L}\right) s\psi$ radians Yaw correction: $\Theta_3 = \delta c\psi + \frac{\rho x \Theta s\psi}{L}$ radians where $L = x^2 + y^2 + (z+\rho)^2$ Frames A, B, C and F are used to set the stage for the problem, and are obtained as follows:

Frame A is an inertial frame aligned to the line of nodes 20, and is used as the basic coordinate system to which other coordinate systems are referred. Frame A is defined as follows: $\hat{a}_3$ is parallel to the line of nodes 20, directed from the ascending node 16 to the descending node 18; $\hat{a}_2$ is normal to the equatorial plane, directed from North to South; and $\hat{a}_1 = \hat{a}_2 \times \hat{a}_3$.

Frame B is used to define the orientation of the bias momentum vector. In our preferred embodiment, the bias momentum vector lies in the plane containing the normals of the equatorial plane and the inclined orbit plane, substantially between them. Frame B is produced by rotating frame A by an angle "δ" about $-\hat{a}_3$. The satellite bias momentum is directed along $-\hat{b}_2$.

Frame C is used to define the inclined orbit 14. It is produced from frame A by rotating frame A first by the angle $\theta$ about $-\hat{a}_3$, then by an angle $\psi$ about the new (rotated by $\theta$) orientation of $-\hat{a}_2$. "$\theta$" is the inclination of the inclined orbit 14, and is the angle in the inclined orbit 14 between the ascending node 16 and the satellite 10. $\hat{C}_3$ is directed from the satellite to the earth's center 22, $\hat{C}_2$ is orbit normal, in the opposite direction from the angular rate of the orbit, and $\hat{C}_1 = \hat{C}_2 \times \hat{C}_3$.

Frame F is an earth-fixed frame, used to define the locations of objects fixed in the earth. It is produced by rotating frame A by $\psi$ about $-\hat{a}_2$. Note that when $\theta$ is zero, frames F and C coincide.

Our first step then is to define the desired payload orientation in the inclined orbit 14. In general, the best results will be obtained by taking the position of the satellite 10 in the inclined orbit 14, at relatively close time intervals, and determining what orientation the payload should have at each time interval to get a ground coverage pattern which best meets the payload requirements. This optimization, in general, will have different criteria for every satellite, depending on the customer's desires.

For the purpose of this example, however, we shall pick the arbitrary earth-fixed point 36, fixed with respect to the earth 30 (say, a ground station, or ground region to be favored), and require that the coverage of this point be the same in the inclined orbit 14 as it is when the satellite 10 is in the geostationary orbit 12. We want the payload beam to have no E/W or N/S pointing error induced by the orbit inclination $\theta$, and we do not want it to have any rotational error (rotation of the payload around the vector from the satellite 10), either. More rigorously, we want: 1) the vector from the satellite 10 to this earth-fixed point 36 to remain fixed in the payload frame (no E/W or N/S error). 2) the plane in the payload frame containing the satellite 10, a vector in the satellite 10 parallel to the earth's spin axis $\hat{a}_2$ and the earth-fixed point 36 remains fixed in the payload frame (no rotational error). The first condition ensures that the fixed point 36 receives the same part of the payload antenna pattern which it did in the geosynchronous orbit 12, and the second condition ensures that the fixed point sees the same antenna polarization. (For example, if the pattern were vertically polarized, and the ground dish were mounted on an equatorial mount, the beam it received would still be vertically polarized). The N/S, E/W and rotational errors are sometimes loosely referred to as roll, pitch and yaw errors.

This form of specifying the desired payload behavior (no inclination-induced change at a single earth-fixed point) serves quite well in the (common) case that the satellite 10 serves a relatively small geographic region of the earth 30, and is the same type of payload performance criterion that was used in U.S. Pat. Nos. 4,776,540 and 4,084,772.

This payload specification is used to define frame P, a frame fixed in the payload: $\hat{p}_3$ is directed from the satellite 10 to the earth-fixed point 36, $\hat{p}_1$ lies in the direction of $\hat{a}_2 \times \hat{p}_3$, and $\hat{p}_2 = \hat{p}_3 \times \hat{p}_1$. In terms of the specification above, $\hat{p}_3$ is the vector from the satellite 10 to the earth-fixed point 36, fixed in the payload frame, and the payload-fixed plane containing the satellite 10, a vector parallel to $\hat{a}_2$ passing through the satellite 10, and the earth-fixed point 36 is the plane containing $\hat{p}_3$ and $\hat{p}_2$. (A plane through the origin can be defined as the set of all vectors perpendicular to a given vector. $\hat{p}_1$ is perpendicular to $\hat{a}_2$, $\hat{p}_3$, and $\hat{p}_2$, by construction, so $\hat{a}_2$, $\hat{p}_2$ and $\hat{p}_3$ are coplanar, therefore $\hat{a}_2$ lies in the $\hat{p}_2-\hat{p}_3$ plane).

To actually arrive at $C_{ap}$, as defined above, requires a little more explanation. The vector from the center of the earth 30 to the arbitrary earth-fixed point 36 is defined as $x\hat{f}_1 + y\hat{f}_3 + z\hat{f}_3$. Since frame F was defined as an earth-fixed frame, and x, y, z are constants, this point is earth-fixed. The vector from the satellite 10 to the center of the earth 30 is $\rho\hat{C}_3$, by definition of $\hat{C}_3$ above and definition of $\rho$ as the distance from the satellite to the center of the earth 30. Therefore, the direction of $\hat{p}_3$ is parallel to $x\hat{f}_1 + y\hat{f}_2 + z\hat{f}_3 + \rho\hat{C}_3$. From there, $C_{ap}$ can be easily computed from $C_{fa}$, $C_{ca}$, and the formulas above for $\hat{p}_1$, $\hat{p}_2$, and $\hat{p}_3$, to obtain $C_{fp}$. To determine how to offset the payload 32 so that the payload orientation as a function of time can be governed as required by $C_{ap}$, we need to relate frame P to the payload frame. We do this in two steps: we define a frame X, which is fixed in the payload 32, and coincides with the spacecraft frame in the absence of any corrections, and a frame G, which is the frame that defines the nominal spacecraft orientation in the inclined orbit 14. Once these are defined, we have everything needed to determine the required reorientation of the payload 32 with respect to the satellite frame, $C_{xg}$.

Frame X is obtained by noting that, in the nominal, geostationary orbit ($\theta=$, $\delta=0$), where, by assumption, the payload performance is as desired, the orientation of the satellite 10 remains fixed with respect to the earth 30, and hence fixed with respect to frame F. Therefore, frame F will be used to describe the orientation of the satellite 10 in the nominal geostationary orbit 12. Since we are interested in defining the difference in the required payload orientation from that in geosynchronous orbit, by definition, no payload reorientation is required in geostationary orbit, and the payload frame remains fixed with respect to the satellite frame. Therefore, we can choose a payload fixed frame X which coincides with frame F in that case. At this point, we note that the vector from the satellite 10 to the earth-fixed point 36 is $x\hat{f}_1 + y\hat{f}_2 + z\hat{f}_3 + \rho\hat{f}_3$ in this case, and run through the definitions of $\hat{p}_1$, $\hat{p}_2$, and $\hat{p}_3$ to obtain $C_{fp}$. Since frame X coincides with frame F here, $C_{xp} = C_{fp}$, and since $C_{px}$ is the transpose of $C_{xp}$, we have $C_{px}$, as defined above. Since both X and P are fixed in the payload frame, and their relation is determined from the situation in the nominal orbit, where $\theta$ and $\delta$ are zero, $C_{px}$ depends only on x, y, z and $\rho$.

We now need to determine the motion of the satellite-fixed frame in inclined orbit. In the absence of any reorientation, the payload fixed frame X remains coincident with the satellite frame, and since $C_{px}$ is time-invariant, frame P will be determined. Any difference between that time history of P and the desired one derived above as $C_{pa}$ constitutes the required reorientation of the payload frame with respect to the satellite frame.

For the geostationary orbit 12, we picked frame F as our satellite frame—for the inclined orbit, we need to maintain a consistent definition, but we will call the satellite frame, frame G, and account for two changes—the satellite angular momentum has undergone a rotation $\delta$ about $-\hat{a}_3$, and is parallel to $\hat{b}_2$, and the direction from the satellite 10 to the earth 30 is now $\hat{c}_3$, due to the orbit inclination $\theta$. The satellite 10 2-axis is defined by the momentum bias direction, so $\hat{g}_2 = \hat{b}_2$. The earth sensor maintains the earth center 32 in the spacecraft 2-3 plane, so the spacecraft 1-axis must be perpendicular to the line from the satellite 10 to the earth 30. Since the 1-axis is also perpendicular to the 2-axis, $\hat{g}_1$ is parallel to $\hat{g}_2 \times \hat{c}_3$. $\hat{g}_3$ is, by definition, $\hat{g}_1 \times \hat{g}_2$. With the use of $C_{ba}$ and $C_{ca}$, these facts yield $C_{ga}$, as given above. This completes the second step of our outline.

We have derived $C_{ga}$, $C_{ap}$ and $C_{px}$, and can now compute $C_{gx} = C_{ga} C_{ap} C_{px}$. The transpose of $C_{gx}$, $C_{xg}$, is the required reorientation of frame X with respect to G (the required reorientation of the payload 32 with respect to the satellite) to achieve the desired pointing offset, which completes the third step outlined.

The form of $C_{xg}$, however, is rather too complicated to give much insight into its implications. This is not a problem in implementing it—it is trivial to compute numerically, but it doesn't make it easy to see the benefits of this invention.

Most proposed applications for near-geostationary satellites have asked for rather small inclinations, with $\theta$ less than 3 degrees. By using an approximation of $C_{xg}$, good for small inclinations, it is easier to see the implications of this invention. As we will see, for inclinations in this range, the approximation is good enough that it could be used directly in many instances, to simplify the implementation.

$C_{xg}$ was expanded about the case of $\theta=0$, $\delta=0$, using a Taylor series expansion, to get the approximation $\bar{C}_{xg}$ defined above, which is linearized in and but general, otherwise.

Since $\bar{C}_{xg}$ represents small angular corrections, the correction angles are simply the upper off-diagonal terms—a rotation of $\bar{C}_{xg}(2,3)$ about the spacecraft 1-axis (roll axis) and a rotation of $\bar{C}_{xg}(1,2)$ about the spacecraft 3-axis (yaw axis). Since these are small angles, the order in which these rotations are performed is unimportant, as well. So, from the derivation above the roll correction (in radians) is: $(\delta - \rho(z+\rho)\theta/L) \sin(\psi)$, and the yaw correction (in radians) is:

$$\cos(\psi) + \rho x \theta \sin(\psi)/L, \text{ where } L = x^2 + y^2 + (z+\rho)^2.$$

The 3-axis momentum wheel gimbal 34 is typically controlled by commanding roll and yaw offsets, so this step completes the fourth step outlined. For larger offsets, where the order of rotations becomes important, the full formula for $C_{xg}$ could be used, and the well known formulas for relating direction cosine matrices to ordered rotations could also be used.

The range of the 3-axis momentum wheel gimbal 34 used here is limited by the square root of the sum of the squares of the yaw correction angle and the roll correction angle. If the fixed point is on the nominal satellite longitude (i.e., if x=0), it can be seen from the linearized formula that by setting the inclination of the satellite momentum bias to half of what the roll error would be if the momentum bias were kept equatorial normal ($\delta=0$), that is, if $\delta=(z+\rho) \rho/L) \theta/2$, then the roll and yaw corrections required have equal magnitudes and bear a sine:cosine relationship over the day (as $\psi$ goes from 0 to $2\pi$ radians), and the sum of the squares of the roll and yaw corrections are equal throughout the day (and minimized), as desired.

By placing the momentum bias at the above described value for $\delta$, we are placing the momentum bias at the mean of the equatorial normal attitude $\delta=0$ and an attitude at which the roll error would be zero at $\delta=\rho(z+\rho)\theta/L$. Because the roll and yaw errors bear a sine:cosine relationship the payload pitch axis is seen to describe a right circular cone about the momentum bias for these small angles. The zero roll error attitude is the attitude disclosed in the Westerland patent referenced above. Thus, we see for small angles to point the payload at a fixed point on the earth we place the momentum bias at the mean of equatorial normal and the Westerland attitude, and as such the payload describes a right circular cone about this attitude. This completes the fifth step of our procedure.

Now that the desired offset profile has been calculated on the ground, it is uploaded to the satellite 10. In general, the offset function can be computed by the on-board computer in any form desired: as an interpolated lookup table, a Fourier series expansion—whatever is best suited at the time. In the preferred embodiment, the profiles are sent to the satellite 10 in the form of Fourier coefficients and their time derivatives for each axis. For small inclinations, by the formula above, only four coefficients and four derivatives are needed: the sine and cosine coefficients for roll and yaw, and their derivatives, since no pitch correction is required for small inclinations.

The time derivative of the coefficients are provided to minimize the number of ground updates required. It seems reasonable to update these coefficients whenever the satellite station keeping maneuvers are done to maintain the satellite longitude and orbit circularity, since these maneuvers require ground intervention and orbit determination in any event, and affect the orbit elements. These maneuvers are typically done every 2-4 weeks. It is desirable not to have to update the coefficients more frequently than that. The orbit inclination $\theta$ change in two weeks is significant—inclination drift rates for geosynchronous orbits approach 1° per year, or about 0.04° every two weeks. An error of 0.04° in roll is significant, so the rate of change of the orbit elements should be accounted for, and the information provided to the satellite 10, in order for acceptable pointing to be obtained with ground updates less frequently than every two weeks.

Both sine and cosine coefficients are used for both the roll and yaw offsets, because $\psi$ is measured from the time of the ascending node 16, a parameter that needs to be communicated to the satellite 10. The suggested method of accomplishing this is to convert the profiles from functions of the orbit angle from the ascending node 16 $\psi$ to spacecraft time of day (TOD), so the computations can be done using the spacecraft time-of-day signal. Since there will be a fixed shift, $\phi$ between $\psi$ and TOD ($\psi=TOD+\phi$), sin ($\psi$)=sin (TOD+$\phi$), and cos ($\psi$)=cos (TOD+$\phi$), both of which can be written in the form Asin(TOD)+Bcos(TOD), using the trigonometric formulas for sums of angles. So, the coefficients for the roll and yaw offsets uploaded would be the coefficients for sin(TOD) and cosine (TOD).

Based on the satellite clock, the offset angles for roll, pitch and yaw are periodically computed and summed to the roll, pitch and yaw offset commands to the momentum wheel gimbal servos.

Although the Fourier series computation on-board, involving as it does trigonometric functions, may seem burdensome to the spacecraft computer, there are efficient ways of generating these signals. In the first place, the maximum update rate required is small for small inclinations. The preferred 3-axis momentum wheel gimbal 34 has a step size of roughly 0.003°. The peak offset step rate required for a 5° inclination using the scheme presented is therefore roughly one step every 25 seconds. Further, once initialized, the sines and cosines can be propagated using two first-order difference equations, to form a second-order sampled-data digital oscillator whose states are sin(TOD) and cos(TOD), i.e., $$\begin{vmatrix} sin(TOD) \\ cos(TOD) \end{vmatrix} = \begin{vmatrix} K_{11} K_{12} \\ K_{21} K_{22} \end{vmatrix} \begin{vmatrix} sin(TOD - T) \\ cos(TOD - T) \end{vmatrix}$$

where $K_{11}$, $K_{12}$, $K_{21}$, $K_{22}$ are functions of the update period T, and the orbit period. Also, since the desired roll and yaw offsets are simply linear combinations of the sines and cosines, this pair of first-order difference equations can be transformed via a change of variables, so that the states in the equation above are the roll offsets and yaw offsets, respectively. This method requires only four multiplication operations and two addition operations to update both the roll and the yaw offset, for the small-angle case. Care should be taken, when using this technique, that the calculations are done to sufficient precision, since numerical round off can cause the frequency of this digital oscillator to be other than desired, and also cause a slow growth or reduction in the magnitude. In any event, there are many other suitable on-board representations of the offset profiles.

To get a feel for the magnitude of these effects, and to contrast this approach to the prior art, we present the example used in U.S. Pat. No. 4,776,540. Here, the ground-fixed point lies at the nominal longitude of the satellite 10, at 40° N latitude. The earth 30 is assumed circular, with radius $r_e$32 6378 km, and the orbit radius is assumed to be 6.61 times the earth radius. When the satellite is orbit normal ($\delta=\theta$), the peak roll errors appear at maximum ascension 26 ($\psi=90°$), and maximum descension 24 ($\psi=270°$), as one would predict from the linearized equations above. The roll error could be nulled at either of these points by increasing $\delta$ by an angle $\beta$, to $\delta=\theta+\beta$. U.S. Pat. No. 4,776,540 presents a table of $\beta$ as a function of orbit inclination. In Table I below, these values were computed by three techniques—(1) the formulas presented in U.S. Pat. No. 4,776,540; (2) the full nonlinear $C_{gx}$ formula presented here (converted from a direction cosine matrix into an Euler 3-2-1 rotation sequence of rotation angles using the standard conversion formula, well known to those skilled in the art), and (3) the linearized formulas for small roll and yaw corrections, derived above. Note that a positive roll error from the formulas in this disclosure implies a negative $\beta$ when $\psi=90°$, and a positive $\beta$ when $\psi=270°$, since the roll error is calculated in the satellite body frame, which has rotated 180° in inertial space as $\psi$ goes from 90° to 270°, whereas $\beta$ and $\delta$ are rotations computed in inertial space.

For this problem, the appropriate variables for the formulas in this disclosure are:

$[r_e]$ = 6378 km, $x = 0$, $y$ = $-[r_e]$ sine (40°), $z$ = $-[r_e]$ cosine (40°), and $p$ = 6.6 $L \times [r_e]$, $[\theta]$ = inclination, expressed in radians, $\delta$ = $[\theta]$ The values returned by the formula in U.S. Pat. No. 4,776,540, and those produced by the nonlinear formula for $C_{gx}$ are identical, and are shown below in Table I to four decimal places. The values differ slightly from the values given in the table in U.S. Pat. No. 4,776,540, due to an arithmetic error in computing the Table I in the prior patent. (The nominal boresight angle, bs, was rounded to a tenth of a degree (from 6.28 to 6.3) before computing the Table I, shown to 1/100 of a degree. As a result, the answers shown in the first column of Table I were 0.02° too high, and those in the second column of Table I, 0.02° too low).

TABLE I

| Inclination angle (deg.) | Beta at $\psi = 90$ | Beta at $\psi = 270$ | Beta Average | Beta (small angle) |
|---|---|---|---|---|
| 1 | 0.1189 | 0.1162 | 0.1176 | 0.1176 |
| 2 | 0.2404 | 0.2298 | 0.2351 | 0.2351 |
| 3 | 0.3645 | 0.3406 | 0.3525 | 0.3527 |
| 4 | 0.4911 | 0.4487 | 0.4699 | 0.4703 |
| 5 | 0.6202 | 0.5541 | 0.5871 | 0.5878 |
| 10 | 1.3019 | 1.0385 | 1.1702 | 1.1756 |
| 15 | 2.0392 | 1.4511 | 1.7452 | 1.7634 |

There are two things to point out here. First, the results from the analysis in this disclosure agree with those of the prior work. Second, the linearized model, which has the advantage of providing a simple form for the offset functions, has an error of only slightly worse than 0.01° out to 3° of inclination. Third, U.S. Pat. No. 4,776,540 suggests that $\delta$ be made larger than $\theta$, to minimize the roll error at the cost of producing a yaw error slightly larger than the inclination angle $\theta$. In the present approach, $\delta$ is made less than $\theta$, so that both roll and yaw errors lie within the capabilities of the gimbals, and can be removed entirely.

There are several pertinent variations which may prove the best way to practice this invention in specific cases.

If the satellite 10 has a beacon sensor (not shown), and the choice of payload optimization is the technique presented above, using the beacon station location as the earth-fixed point 36, then, as above, $C_{xg}$ can be derived, and converted into a Euler 3-2-1 body rotation sequence to reorient frame X with respect to frame G. The first rotation (the rotation about $\hat{g}_3$) will be done by the offset profile, and the remaining two automatically by the beacon sensor—it will bring the beacon in line with the beacon station. Also, the order of rotations will be the 3-2-1 sequence: the 3-rotation, via the offset command, will be done at essentially infinite band width. The 2-rotation will be done by pitch control, which is typically higher band width than roll control (the 1-rotation), which will be done last. Thus, the implementation will be consistent with the assumptions, and, even for large offsets, where the order of rotations is important, the desired result will be obtained. If the roll loop band width happens to be higher than the pitch band-width, $C_{xg}$ should be converted into a 3-1-2 Euler body rotation sequence.

A second variation is that many earth sensors have rather limited roll offset capability, and, if they are rigidly mounted to the payload (as in the case above), they cannot maintain their accuracy when the payload follows its zero-error profile. One way of addressing this is to employ roll gimbals such that the earth sensor and momentum wheel are on one side of the gimbal, and the payload is on the other. This allows the payload to follow the desired path while limiting the earth sensor roll offsets to an acceptable (not necessarily zero) level.

A third interesting variation is to produce some of the required offset pointing using external torquing means that do not require consumption of expendables. For instance, many satellites use magnetic torquers or solar sails, together with on-board 3-axis attitude estimation, to maintain the bias momentum aligned in the desired direction (along $\hat{g}_2$). By introducing a diurnal offset profile in the commanded attitude, (commensurate with the available torque authority), the allowable amount of inclination could be increased.

Clearly, the idea of making use of the freedom to place the nominal direction of the bias momentum to allow optimal use of at least three independent degrees of freedom of payload orientation control could be implemented using many different types of sensors and actuators, combined with various types of control schemes.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of orienting a spacecraft payload of a momentum biased spacecraft orbiting the earth in essentially a geosynchronous orbit in order to maintain the payload pointed at a desirable pointing profile on the earth in the presence of orbit inclination, said method comprising the steps of:

determining the inclination and phasing of the spacecraft's orbit;

calculating a coning motion in inertial space traced out by a pitch axis defined by the spacecraft payload as the payload is maintaining a desirable pointing profile throughout the orbit;

orienting the spacecraft bias momentum at substantially the center of the cone traced out by the pitch axis by applying external torque to the spacecraft;

offsetting the spacecraft payload sinusoidally in a yaw direction with respect to the nominal direction of the bias momentum, the offset having a period of once per day, an amplitude substantially equal to the radius of the cone, and a phase such that the payload pitch axis passes through a plane defined by the spacecraft and the spin axis of the earth when the spacecraft passes through the equatorial plane, wherein the amplitude and phase are determined from the orbit inclination and spacecraft phasing; and pointing the spacecraft at the earth by means of a sensor and applying calculated payload pitch and roll attitude offsets to maintain the payload pointing direction.

2. The method according to claim 1 further comprising the step of placing the nominal bias momentum axis so that the angle between the bias momentum and the mean of equatorial normal and orbit normal is less than half the angle between equatorial normal and orbit normal.

3. The method according to claim 1 wherein the desirable pointing profile is one which maintains the payload pointing with respect to a reference point fixed relative to the earth in the presence of orbit inclination, and wherein the step of orienting the spacecraft bias momentum includes placing the bias momentum between equatorial normal and orbit normal in the plane spanned by equatorial normal and orbit normal at an angle $\delta = \theta \rho(z+\rho)/2L$, from equatorial normal, where is the inclination angle between the geosynchronous orbit and the inclined orbit, $(z+\rho)$ is the distance between the spacecraft and the fixed reference point projected on a line from the spacecraft to the center of the earth, $\rho$ is the orbit radius, and L is the square of the distance from the spacecraft to the fixed reference point.

4. The method according to claim 1 wherein the step of orienting the spacecraft bias momentum by applying external torque includes the use of thrusters for applying the torque.

5. The method according to claim 1 wherein the step of orienting the spacecraft bias momentum by applying external torque includes the use of magnetic torquers for applying the torque.

6. The method according to claim 1 wherein the step of orienting the spacecraft bias momentum by applying external torque includes the use of solar radiation torque mechanisms for applying the torque.

7. The method according to claim 1 wherein the step of applying the calculated payload pitch and roll offsets includes offsetting the payload by means of at least one momentum wheel gimbal.

8. The method according to claim 1 wherein the step of applying the calculated payload pitch and roll offsets includes offsetting the payload by means of a plurality of momentum wheels.

9. The method according to claim 1 wherein the step of applying the calculated payload pitch and roll offsets includes offsetting the payload by means of at least one antenna gimbal.

10. The method according to claim 1 wherein the step of pointing the spacecraft at the earth includes use of a beacon sensor positioned on the spacecraft.

11. The method according to claim 1 wherein the step of offsetting the payload includes offsetting the payload by means of a momentum wheel having three degrees of rotational freedom.

12. The method according to claim 1 wherein the step of offsetting the payload includes precessing the payload by means of external torques to maintain the desirable pointing profile.

13. A method of orienting a payload of a momentum biased spacecraft in an orbit perturbed in inclination from its nominal orbit in order to maintain payload pointing with respect to an orbited body close to that obtained in a nominal orbit, said method comprising the steps of:

determining the inclination and phasing of the spacecraft orbit;

determining a desired payload orientation time history over the orbit;

calculating a coning motion in inertial space traced out by a pitch axis defined by the spacecraft payload as the payload is maintaining a desirable pointing profile throughout the orbit;

orienting the spacecraft bias momentum at substantially the center of the cone traced out by the pitch axis by applying external torque to the spacecraft to optimize the spacecraft's ability to implement the desired payload orientation time history; and offsetting the payload axes from the bias momentum to the desired payload orientation based on the determined time history by means of offset corrections calculated from the steps of determining the inclination and phasing wherein the offsets include time-varying corrections in the yaw direction.

14. The method according to claim 13 wherein the step of offsetting the payload axes includes offsetting the payload axes to include significant corrections about at least two directions orthogonal to the bias momentum.

15. The method according to claim 13 wherein the step of offsetting the payload axes includes offsetting the payload by means of at least one momentum wheel gimbal.

16. The method according to claim 13 wherein the step of determining the payload orientation time history includes determining the payload pitch and roll attitude by means of beacon sensors positioned on the spacecraft.

17. The method according to claim 13 wherein the step of offsetting the payload includes offsetting the payload by means of a momentum wheel gimbal having three degrees of rotational freedom.

18. The method according to claim 13 wherein the step of offsetting the payload includes offsetting the payload by means of at least one antenna gimbal.

19. The method according to claim 13 wherein the step of offsetting the payload includes precessing the payload by means of external torques to maintain the desirable pointing profile.

* * * * *

Disclaimer

5,184,790 —Richard A. Fowell, Culver City, Calif. TWO-AXIS ATTITUDE CORRECTION FOR ORBIT INCLINATION. Patent dated February 9, 1993. Disclaimer filed May 25, 1995, by the assignee, Hughes Aircraft Company.

Hereby enters this disclaimer to claims 1-19 of said patent.
*(Official Gazette* September 5, 1995.)